United States Patent [19]

Buckmaster et al.

[11] Patent Number: 5,032,621
[45] Date of Patent: * Jul. 16, 1991

[54] NUCLEATING AGENTS FOR THERMOPLASTIC RESINS

[75] Inventors: Marlin D. Buckmaster, Vienna, W. Va.; Stuart K. Randa, Wilmington, Del.

[73] Assignee: E. I. du Pont de Nemours and Company, Wilmington, Del.

[*] Notice: The portion of the term of this patent subsequent to Oct. 31, 2006 has been disclaimed.

[21] Appl. No.: 429,128

[22] Filed: Oct. 30, 1989

Related U.S. Application Data

[63] Continuation-in-part of Ser. No. 312,989, Feb. 17, 1989.

[51] Int. Cl.$^5$ ............................................. C08J 9/00
[52] U.S. Cl. .................................... 521/85; 521/89; 521/93; 521/97; 521/121; 521/124; 521/125; 521/130; 521/143; 521/145; 521/146; 521/908; 264/DIG. 13
[58] Field of Search .................. 521/85, 93, 97, 125, 521/130, 146, 143, 145, 124, 89, 121, 908

[56] References Cited

U.S. PATENT DOCUMENTS

| | | | |
|---|---|---|---|
| 3,993,609 | 11/1976 | Kamens et al. | 521/138 |
| 4,328,319 | 5/1982 | Osipow et al. | 521/78 |
| 4,394,458 | 7/1983 | Wade | 521/82 |
| 4,397,948 | 8/1983 | Wade | 521/89 |
| 4,511,678 | 4/1985 | Mahnke et al. | 521/133 |
| 4,877,815 | 10/1989 | Buckmaster et al. | 521/908 |

Primary Examiner—Morton Foelak

[57] ABSTRACT

This invention relates to the use of a special class of sulfonic and phosphonic acids, and salts of the acids, to give improved nucleation for foam extrusion of thermoplastics using either dissolved gas or chemical blowing agents to produce foam.

13 Claims, 2 Drawing Sheets

NUCLEATING AGENTS FOR THERMOPLASTIC RESINS

CROSS-REFERENCE TO RELATED APPLICATION

This is a continuation-in-part of application Ser. No. 07/312,989, filed Feb. 17, 1989 and allowed Apr. 10, 1989.

FIELD OF THE INVENTION

This invention relates to the use of a special class of sulfonic and phosphonic acids, and salts of the acids, to give improved nucleation for foam extrusion of thermoplastics using either dissolved gas or chemical blowing agents to produce foam.

BACKGROUND OF THE INVENTION

Conductive wire is often used to transmit electronic signals. The wire must be protected, or insulated, and thermoplastic coatings are ordinarily used for this. The thermoplastic is extruded from a molten state onto and around the wire. The thermoplastic materials are selected on the basis of having a low dielectric constant and a low dissipation factor. It has previously been found that if the thermoplastic material is foamed as it is applied to the wire, the dielectric constant is desirably lowered, due to the formation of numerous small non-interconnected cells in the foam. In U.S. Pat. No. 3,072,583 is disclosed a nucleated foaming process for extruding perfluorinated polymer foam around transmission wire with a dissolved gas blowing agent. Foamed insulation using other thermoplastic materials, especially polyolefins, is also widely used.

A nucleating agent is needed in the foaming process to achieve uniform, small-diameter cell structure. A preferred art-recognized nucleating agent for fluoropolymer resin is boron nitride, an inert white ceramic powder. A 0.5-2.0 weight loading of boron nitride, based on polymer, normally provides adequate foam cell nucleation. The lower the specific gravity of the molten resin, the more nucleant is needed, on a weight basis. Thus, an ethylene(E)/tetrafluoroethylene(TFE) copolymer(ETFE copolymer) with a melt specific gravity of about 1.3 requires more nucleant than a tetrafluoroethylene(TFE)/hexafluoropropylene(HFP) copolymer(TFE/HFP copolymer) at a melt specific gravity of 1.6.

U.S. Pat. No. 4,764,538 discloses synergistic combinations of boron nitride and certain inorganic salts which give greatly enhanced foam nucleation in fluoropolymers This combination not only allows a significant reduction in the amount of boron nitride needed but also gives improved foam in terms of smaller cells. Improved capacitance and diameter uniformity are also attained.

The present invention provides a special class of sulfonic and phosphonic acids, and salts of the acids, which give very efficient nucleation of a wide variety of thermoplastic materials at low concentrations without the use of boron nitride or any other traditional type of nucleating agent.

As used herein the term "thermoplastic" means and is intended to include any organic material that is rendered soft and moldable by application of heat (Hackh's Chemical Dictionary, Julius Grant, 4th edition, McGraw-Hill Book Company, New York, N.Y.). Other terms used synonymously herein with "thermoplastic" and "thermoplastic material" are "thermoplastic resin" and "polymer," it being understood that the resin or polymer must be capable of being rendered soft and moldable by application of heat, that is, it is melt processible. The term "composition" as it is used herein is intended to include the thermoplastic material and other ingredients or additives which, individually, may or may not be melt processible, as will be discussed in greater detail in the Detailed Description of the Invention.

The compositions of this invention are useful in producing foams for other applications as well as for wire coating. Such examples include, but are not intended to be limited to, foamed sheet for electrical insulation, heat insulation and cushioning; foamed pipe and tubing; and injection molded pieces.

SUMMARY OF THE INVENTION

This invention resides in a foamable thermoplastic resin composition containing as a nucleating agent a nucleating-effective amount of at least one compound which is thermally stable at the melt temperature of the extrusion and is selected from sulfonic and phosphonic acids, and salts of the acids, which compositions significantly enhance foam nucleation, as evidenced by smaller foam cells, higher foam void contents, and/or greater uniformity of cell size. These compositions contain 50 to 8000 ppm, preferably 250 to 3000 ppm, by weight, for most compositions, of one or more of the acids and/or salts which are of the formula

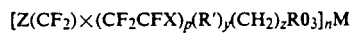

$$[Z(CF_2)_x(CF_2CFX)_p(R')_y(CH_2)_zRO_3]_nM$$

wherein:
  the bivalent groups, except for $RO_3$, may be present in any sequence;
  Z is $CCl_3$, $CCl_2H$, H, F, Cl or Br;
  each X, independently, is H, F, Cl or $CF_3$;
  R is sulfur or phosphorus;
  M is H or a metallic, ammonium, substituted ammonium or quaternary ammonium cation;
  each of x and z, independently, is an integer and is 0 to 20;
  p is an integer and is 0 to 6;
  y is 0 or 1;
  $x+y+z+p$ is a positive integer or, if $x+y+z+p$ is 0, Z is $CCl_3$ or $CCl_2H$;
  n is the valence of M; and
  R' is selected from
    a $C_{5-6}$ perfluorinated alicyclic ring diradical;
    a $C_{1-16}$ perfluorinated aliphatic polyether diradical with repeat units selected from $[CF_2O]$, $[CF_2CF_2O]$, and $[CF_2CF(CF_3)O]$; and
    a substituted or unsubstituted aromatic diradical, in which case, Z is H.

By "foamable, thermoplastic resin composition" is meant any thermoplastic resin composition that is foamable by means of a gas injection process or through use of a chemical blowing agent.

Preferably, M is a metallic cation. When M is H, the resultant sulfonic or phosphonic acid may not be effective in all thermoplastic resin compositions. When M is selected so as to be other than a metallic cation or H, it preferably should be such that the resulting nucleating agent is stable at the foam processing temperature. Failure to provide such consideration in the selection of M may lead to in situ decomposition of the cationic moiety, with resultant conversion of M to H. The significance of this aspect of the invention will be readily understood in view of the significance of M on the foaming process, as described hereinafter in the Detailed Description of the Invention.

The stability of the nucleating agent at the foam processing temperature must be considered not only in connection with the selection of M but also in connection with the selection of the other symbols in the above formula. More specifically, it is to be understood that the nucleating agent should be stable at the foam processing temperature which can vary substantially depending on the thermoplastic being foamed. Thus, in the above formula, when each of x, p and y is 0, z is 1 to 10 and Z is $CCl_3$ or $CCl_2H$, the resultant nucleating agent, for example, trichloroethane sulfonic acid or its M salt will be stable at normal polyethylene foam-processing temperatures, such as below about 315° C., but it will not be stable at the temperature needed to foam high-melting thermoplastics.

DETAILED DESCRIPTION OF THE INVENTION

Figure 1:
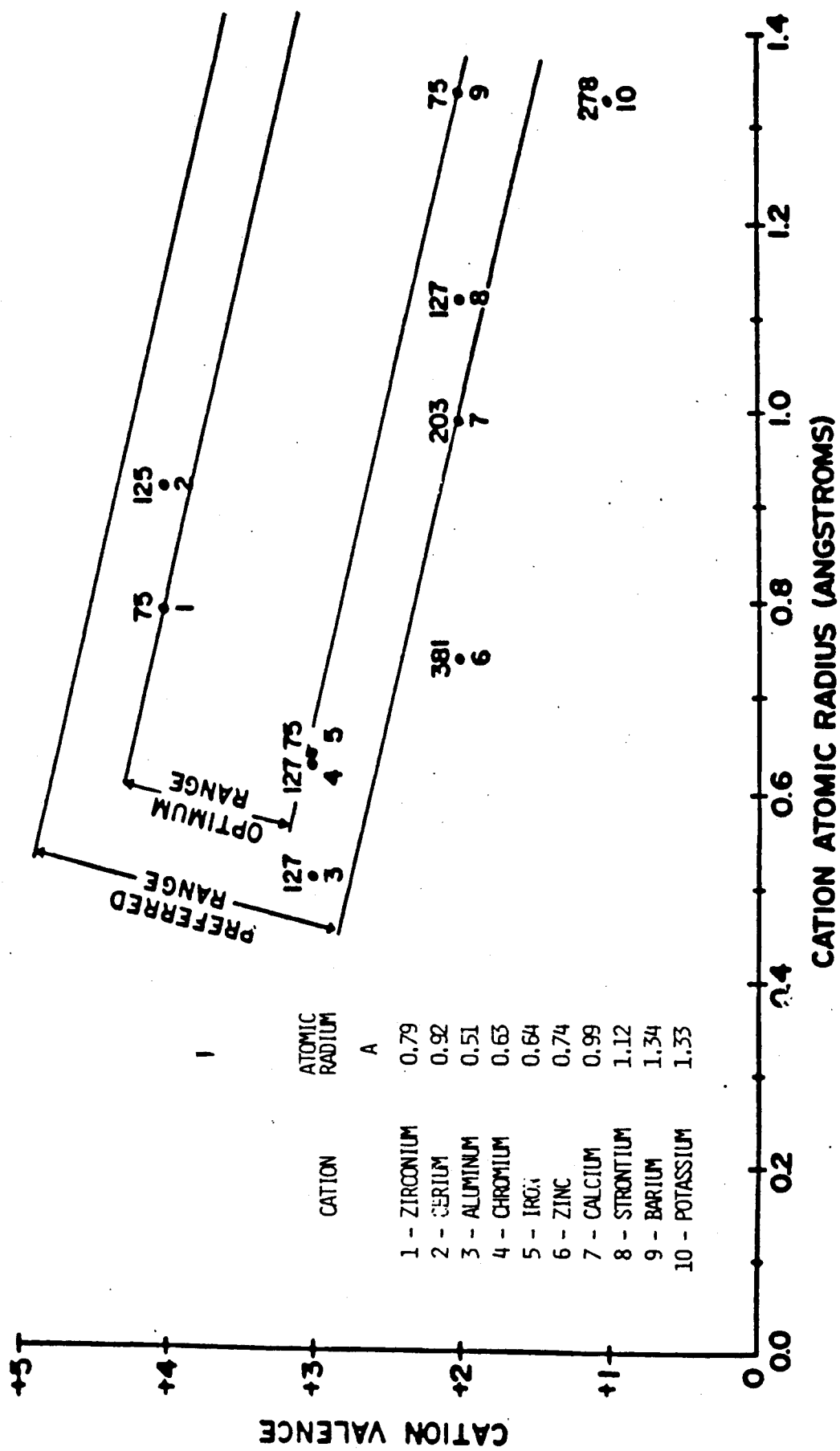
FIG. 1 provides graphical data which may be used in the selection of M in the formula for the nucleating agent (a TBSA salt, defined hereinafter) in the foaming of TFE/HFP copolymer.

The thermoplastic resins useful in the present invention include all such resins which can be foamed by a gas injection process and/or by use of a chemical blowing agent. In particular, suitable thermoplastics are those with a dielectric constant of less than 18, preferably less than 12, for example, 10.2 (Example 15 herein). Especially suitable for making foamed electrical insulation by this invention are those resins with a dielectric constant of less than 3. Following is a list of thermoplastic materials, most of which are commercially available, and their dielectric constants relative to air having a dielectric constant of 1.0:

| | |
|---|---|
| PTFE or TFE/HFP Copolymer | 2.0 |
| TFE/PAVE Copolymer | 2.1 |
| Polypropylene | 2.25 |
| Polyallomers | 2.25 |
| Polyethylene | 2.3 |
| ETFE Copolymer | 2.6 |
| E/CTFE Copolymer | 2.6 |
| EVA Copolymer | 2.75–2.8 |
| Polycarbonate | 2.96 |
| Polyimide | 3.0–3.5 |
| Polysulfone | 3.13 |
| PVC | 4.5–5.8 |
| Nylon | 4.5 |
| $PVF_2$ | 2.98–8.4 |
| Urethanes | 6.7–7.5 |
| Neoprene @ 1000 KM | 16–17 |

Preferred examples of suitable thermoplastics include melt processible fluoropolymers; polyolefins; copolymers of alpha-olefins and alpha, beta-unsaturated carboxylic acids having 3 to 8 carbon atoms, and their metal salts of Groups I to III of the Periodic Chart of the Elements. Examples of other operable thermoplastics include polystyrenes; polyamides; polyesters; vinyl polymers, such as polyvinyl chloride; uncured natural and synthetic rubbers; and the broad class of resins known as thermoplastic elastomers. It is to be further understood that the thermoplastic resins which are useful herein include copolymers such as styrene copolymers, acrylonitrile/butadiene/styrene polymers, and blends thereof, and blends of polymers with non-polymeric materials, for example, pigments, fire retardants, minerals and carbon, that is, any material commonly present in foamed compositions. In other words, the invention is useful with any virgin or blended resin that is capable of being foamed by a gas injection process or by means of a chemical blowing agent.

Foamed fluoropolymer wire insulation, one of the preferred embodiments of this invention, is generally produced in the art by a continuous, gas injection process using chlorodifluoromethane(F-22), nitrogen, carbon dioxide, or other gas or gas mixture which is soluble in the molten resin, using an extruder screw designed for foam operations, and using boron nitride as a nucleating agent. In such processes the gas dissolves in the molten resin inside the extruder. Absorption follows Henry's Gas Law which states that the equilibrium value of the mole fraction of gas dissolved in a liquid is directly proportional to the partial pressure of the gas above the liquid surface. By adjusting the gas pressure in the extruder, the amount of gas dissolved in the melt can be controlled. Generally, the greater the amount of gas dissolved in the melt, the greater the void volume in the resulting foam.

Chlorodifluoromethane(F-22) is especially suited for foaming because it easily dissolves in molten fluoropolymer resins, and its thermal stability is adequate to survive the holdup time in the extruder when mixed with molten resin at temperatures up to 380° C.

As an alternative process, a chemical blowing agent (a chemical which is unstable at the polymer processing temperature and liberates a gas, such as nitrogen, carbon dioxide or hydrogen) can be incorporated into the thermoplastic to provide the dissolved gas which causes bubble formation.

Foam cell formation actually starts shortly after the molten resin containing the blowing agent passes out of the extrusion die. The gas dissolved in the molten resin comes out of solution because of the sudden drop in melt pressure as the extrudate exits the extrusion die. As shown in U.S. Pat. No. 4,764,538, extrusion speed and drawdown influence foaming. The polymer is solidified when the extrudate enters water in a cooling trough, stopping foam cell growth.

A nucleating agent is needed to achieve uniform, small-diameter cell structure. The preferred commonly used nucleating agent for fluoropolymer resins has been boron nitride, an inert white ceramic powder. The present invention covers a special family of sulfonic and phosphonic acids, and salts of the acids, which give very efficient nucleation at low concentrations. The optimum nucleating agent and concentration depend on the specific polymer and conditions employed in the foaming process.

The nucleating agent of this invention can be blended with virgin or blended polymers, as powder or pellets, and extruded to give a homogeneous composition containing the desired amount of the nucleating agent, generally 50–8000 ppm, preferably 250–3000 ppm. Alternatively, the agent can be added to the virgin or blended polymer as a concentrate which may contain 5–20 times the desired amount of nucleating agent, and then the concentrate is mixed with 20–5 parts of virgin or blended polymer before the foaming step.

With chemically blown compositions the blowing agent and nucleating agent can be blended with virgin or blended polymer powder and either compacted into pellets at room temperature to avoid premature decomposition of the blowing agent, or extrusion-compounded at a temperature at which the blowing agent is not decomposed to a substantial extent.

FIG. 1 and Examples 2 and 3 show how routine experimentation can help select the best cation for foaming a particular resin (TFE/HFP copolymer) with a room temperature dielectric constant of 2.05 with $CHF_2Cl$ using a salt of Telomer B sulfonic acid(TBSA). Telomer B sulfonic acid is of the formula $F(CF_2)_nCH_2CH_2SO_3H$ wherein n is a mixture of 6, 8, 10 and possibly 12, predominantly 8. The results for different cations are plotted on the FIG. 1 graph using the atomic radius of the cation as abscissa and cation valence as ordinate; above the point for each cation is shown the minimum average diameter of the foam cells in micrometers for the optimum concentration tested. It is desirable to have very small cells and high foam void content. It can be seen in FIG. 1 that the cations giving cell diameters equal to or less than about 200 micrometers fall between the two outer lines (the preferred range). The cations giving still smaller cell diameters, equal to or less 75 micrometers, fall between the two inner lines (optimum range). As is apparent, for TFE/HFP copolymer the best cations are $Zr^{++++}$, $Fe^{+++}$, and $Ba^{++}$. The preferred nucleating agent concentration for these cations with this copolymer is 500-2000 ppm. Thus, FIG. 1 provides a means for predicting how other salts of TBSA will perform in TFE/HFP copolymers with $CHF_2Cl$ as blowing agent. Similar performance is observed when the thermoplastic resin is a copolymer of tetrafluoroethylene and a perfluoro(alkyl vinyl ether), such as perfluoro(propyl vinyl ether).

Table 1 which follows shows the great difference in nucleating efficiency of various bivalent salts of TBSA in the experiments depicted in FIG. 1. It also shows that efficient nucleation results in both high void content in the foam and small diameters of the foam cells.

In Table 1 and in all the remaining tables herein, the following abbreviations are used:
SPC: Specific Void Content
AFCD: Average Foam Cell Diameter (at mid-wall)
M: Micrometers
%V: % Voids in Foam as Calculated from the Measured Dielectric Constant
$cm^3$: Cell Count/$cm^3$ at the Specific Void Content
Conc.: Concentration
Ex St: Extrusion Stability
DC: Dielectric Constant
FCC: Foam Core Capacitance (lowest value)
pF/m: Picofarads/meter
C: Capacitance

TABLE 1

| TBSA Salt | cc/$cm^3$ | % V | AFCD (M) |
|---|---|---|---|
| Barium | 2,300,000 | 55 | 75 |
| Strontium | 763,000 | 59 | 100 |
| Calcium | 72,200 | 41 | 220 |
| Zinc | 24,800 | 20 | 508 |

Figure 2:
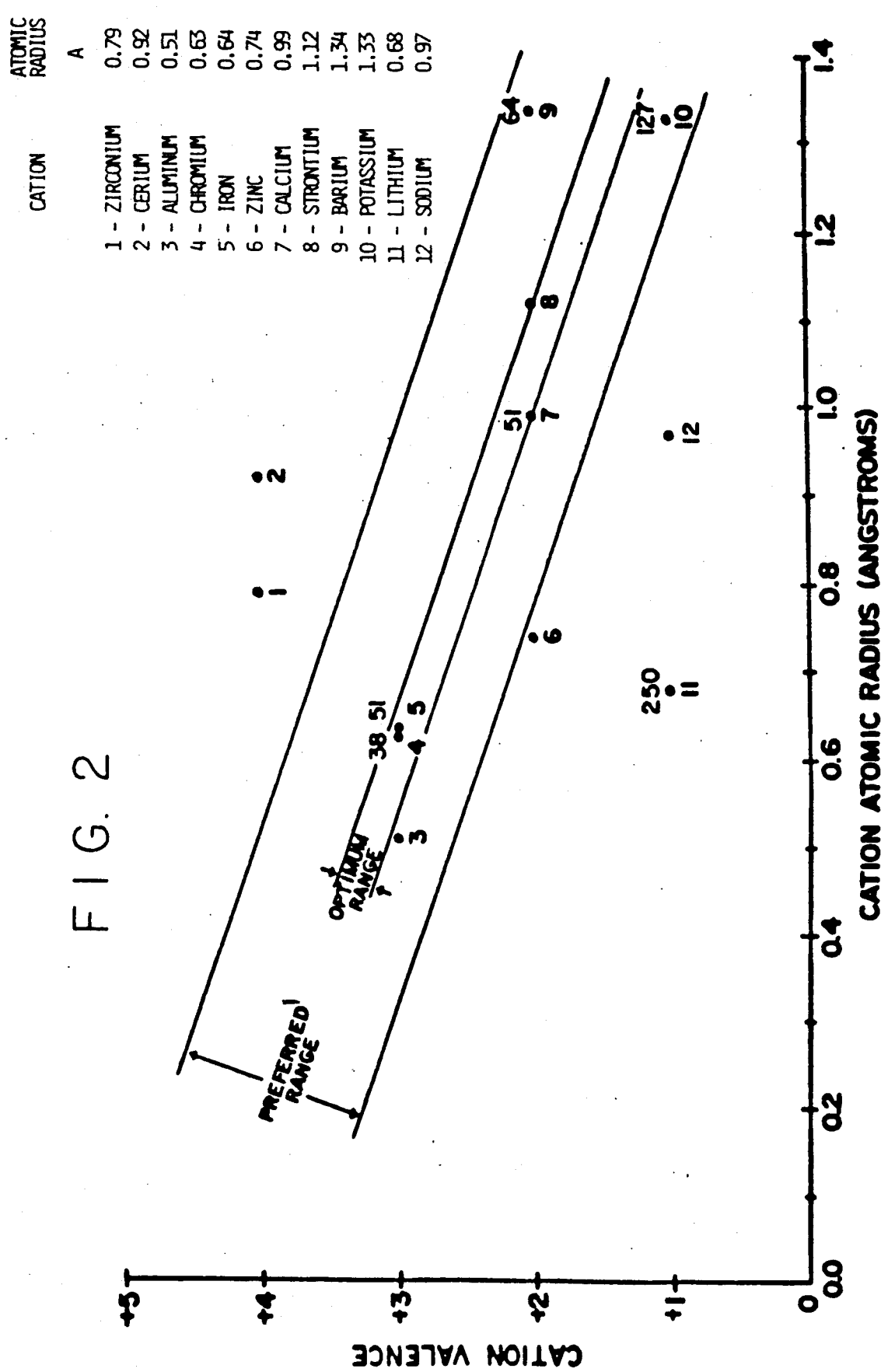
FIG. 2 provides graphical data which may be used in the selection of M in the formula for the nucleating agent (a TBSA salt) in the foaming of polyethylene.

FIG. 2 and Example 11 show a similar plot for a polyethylene which has a room temperature electric constant of 2.3. Salts of the same TBSA (as in FIG. 1 and Examples 2 and 3) were used, with nitrogen as the blowing agent. FIG. 2 has the same general appearance as FIG. 1, but a narrower optimum range has been chosen (cell diameters equal to or less than about 50 micrometers), and the polymer and blowing agent are different. FIG. 2 shows that with this polyethylene the preferred TBSA salts are those of $Cr^{+++}$, $Fe^{+++}$, and $Ca^{++}$. The preferred nucleating agent concentration for these cations with this polymer is 1000-3000 ppm.

One might expect that fluorine-free salts, such as sodium lauryl sulfate, would be effective nucleating agents for polyethylene, just as the fluorine-containing salts of this invention are for fluoropolymers. Surprisingly, this is not always the case, as shown by Comparative Example B between Examples 11 and 12 herein. Comparative Examples A and B show, also, the inoperability of other compounds as nucleating agents.

Also demonstrated in the examples herein are foamed compositions comprising ethylene/tetrafluoroethylene copolymers. Preferred nucleating agents for such resins include the calcium salt of Telomer B sulfonic acid and the potassium salt of a perfluorinated alkane sulfonic acid of 1-10 carbon atoms. A preferred concentration of such nucleating agents, based on the composition, is 1000 to 3000 ppm.

The broad applicability of the invention is further demonstrated in the examples using polyolefins as the thermoplastic resin. Examples of polyolefins include, but are not limited to, polyethylenes, linear and branched, low density and high density. Blends of polyethylenes, and blends of polyethylene or polyethylenes with other thermoplastic resins are operable herein. Preferred nucleating agents with polyethylene-containing thermoplastic resins are the potassium salt of perfluorooctane sulfonic acid, and the calcium, iron or chromium salt of TBSA, at a preferred concentration of 1000 to 3000 ppm, based on the composition.

In general, polymers having high dielectric constants respond best to TBSA salts with small cation radius and low valence. As the acid strength and/or chain length of the salt anion change in any given polymer, the optimum cation also tends to change. In the polyethylene of Example 11 the optimum cation for a TBSA salt is chromium, whereas with a perfluorooctanesulfonic acid the optimum cation is potassium; with trifluoromethanesulfonic acid, sodium is the best cation of those tested. Thus, as the strength of the sulfonic acid increases and/or chain length decreases, the optimum cation moves down or to the left in a plot, such as in FIG. 2. The phosphonic acids, and their salts, of this invention give results similar to those described above for the sulfonic acids and their salts. It is to be understood that routine experimentation may be required to find the optimum cation and anion for each thermoplastic, with dependence also on variables such as the molecular weight distribution of the thermoplastic, the polarity of the gas used, and the extrusion temperature. However, as demonstrated herein, efficient nucleation is achievable with the nucleating agents of the invention in a wide variety of polymers.

The present invention provides means for producing foamed thermoplastics having a combination of a uniformly small cell size, less than 400 micrometers, and a very high void content, greater than 50%. For example, using TFE/HFP copolymer thermoplastics, cell sizes of less than 100 micrometers (average) and void contents of greater than 60% can be achieved. Using polyethylene thermoplastics, cell sizes of less than 100 micrometers (average) and void contents of greater than 50% can be achieved. Foams of similar structure (as with polyethylenes) can also be produced using E/TFE copolymers as the thermoplastic.

EXPERIMENTAL DETAILS

In the examples herein the foaming process was carried out by either a continuous gas injection foaming process or by extruding a composition containing a chemical blowing agent in the same extruder, with no gas injection.

The continuous gas injection foaming process was normally carried out using chlorodifluoromethane (F-22) or nitrogen as the blowing agent. Other known blowing agents could be used to give substantially the same results. The foam void level was controlled by the pressure of the blowing agent. The extruder screw design allowed for gas injection and had a mixing torpedo (as disclosed in U.S. Pat. No. 3,006,029) to provide a uniform melt. This mixing torpedo allowed each resin cube blend to become a uniform melt mixture while traversing the length of the screw.

Nucleated compositions for the gas injection process can be prepared by cube blending of the resin (melt cut or strand cut) with a nucleating agent concentrate prepared by blending the sulfonic or phosphonic acid, or its salt, in the form of a powder, with resin powder and/or cubes, and extruding on a 28 mm Werner & Pfleiderer (W&P) twin screw extruder with a strand cutter to pelletize. The resulting cube blends were fed directly to the wire coating extruder hopper.

ETFE copolymer compositions containing chemical blowing agents were prepared by blending the chemical blowing agent and nucleating agent with polymer powder and compacting into cylindrical pellets about 3 mm in diameter and 6 mm in length with a lab model California Pellet Mill. These pellets were fed directly to the wire coating extruder hopper.

Foam cell size was determined at mid-wall of the foam by visual examination with a microscope or by taking a picture of a thin section of foamed wireinsulation at 20-30X magnification and visually determining average cell size. In some examples the number of cells/cm$^3$ is also given. This value is calculated from the foam void level and the average cell diameter.

Additional abbreviations used in the examples are shown in Table 2. In reciting specific polymer compositions in the table, there is no intent to limit the scope of the polymers operable herein to those specific compositions. Typical conditions used in the examples that follow are shown in Table 3. Regarding Table 3, in Column C a Maillefer extruder was used to produce the foam and an Entwistle extruder was used to produce the skin. In Column H the extruder was a Davis-Standard. In all other columns the extruder was an Entwistle. Further regarding Table 3, in Column A, a B&H 75 crosshead was used; in all other columns the crosshead was a Maillefer 4/6F. Finally, the Column C conditions were carried out to produce a foam-skin construction, using two extruders and a single crosshead.

Foam cell size depends not only on the nucleating agent, but also on other variables, such as wire speed and, in the case of melt draw extrusion, cone length (the distance from the die exit to the point where the molten tubular polymer forms on the wire), as explained in U.S. Pat. No. 4,764,538. Cone length is related to the applied vacuum inside the cone.

TABLE 2

| | |
|---|---|
| TFE/HFP copolymer | a copolymer of 12.3 wt % HFP and the balance TFE with a melt flow rate of 6.6 at 372° C. as measured by ASTM D-2116-83 |
| PAVE | perfluoro(alkyl vinyl ether) |
| EVA | Ethylene/Vinyl Acetate |
| PVF$_2$ | Poly(vinylidene fluoride) |
| boron nitride | SHP-325 grade from Carborundum Corp., having a BET surface area of 8.6 m$^2$/g |
| polyarylate | aromatic polyester of Bisphenol A and isophthalic acid, with a melt viscosity at 330° C. of 1600 Pa · s at 100 sec$^{-1}$ and 2800 Pa · s at 10 sec$^{-1}$ |
| E/TFE copolymer | copolymer of 19.6 wt % ethylene, 2.2 wt % perfluorobutyl ethylene, and the balance TFE, with a melt flow rate of 14 at 297° C. by ASTM D-3159-83 |
| Ficel ® | Ficel ® AF-100 formulated zinc compound, a chemical blowing agent from Sherex Chemical Co. |
| Expandex ® | Expandex ® 175, barium salt of 5-phenyl tetrazole, a chemical blowing agent of Olin Chemicals, Stamford, Connecticut |
| TFE/PPVE(1) copolymer | copolymer of TFE and 3.9 wt. % perfluoro(propyl vinyl ether), with a melt viscosity of 2.2 × 10$^4$ poise at 372° C. |
| TFE/PPVE(2) copolymer | copolymer of TFE and 3.9 wt. % perfluoro(propyl vinyl ether), with a melt viscosity of 4.25 × 10$^4$ poise at 372° C. |
| E/CTFE copolymer | copolymer of ethylene and chlorotrifluoroethylene |
| FEP copolymer | copolymer of TFE and 12.3 wt. % hexafluoropropylene, with a melt flow rate of 6.6 at 372° C. (ASTM D-2116-83) |
| ZrS-10 | zirconium (+4) salt of TBSA |
| CrS-10 | chromium (+3) salt of TBSA |
| CeS-10 | cerium (+4) salt of TBSA |
| KS-10 | potassium salt of TBSA |
| HS-10 | TBSA |
| AS-10 | aluminum salt of TBSA |
| SrS-10 | strontium salt of TBSA |
| CaS-10 | calcium salt of TBSA |
| ZnS-10 | zinc salt of TBSA |
| BaS-10 | barium salt of TBSA |
| LS-10 | lithium salt of TBSA |
| FS-10 | iron (+3) salt of TBSA |
| TEAS-10 | triethyl amine salt of TBSA |
| BS-6A | barium p-(perfluoro[1,3-dimethylbutyl]) benzene sulfonate |
| BS-9A | barium p-(perfluoro[1,3,5-trimethylhexyl]) benzene sulfonate |
| BaS-A1(H) | barium p-toluene sulfonate |
| BaP-A | barium benzene phosphonate |
| NaP-A | sodium benzene phosphonate |
| NaS-A(II) | 4,5-dihydroxy-m-benzene disulfonic acid disodium salt |
| BS-8 | barium perfluorooctane sulfonate |
| KS-8 | potassium perfluorooctane sulfonate |
| KS-8C | potassium perfluorocyclohexylethane sulfonate |
| NaS-1 | sodium trifluoromethane sulfonate |
| KS-1 | potassium trifluoromethane sulfonate |
| KS-1(H) | potassium methane sulfonate |
| BaS-3(H) | barium propane sulfonate |
| NaTCA | sodium trichloroacetate |
| BTBP | barium salt of F(CF$_2$)$_n$CH$_2$CH$_2$PO$_3$H wherein n is a mixture of 6, 8, 10 and possibly 12, predominantly 8 |
| NTBP | sodium salt of F(CF$_2$)$_n$CH$_2$CH$_2$PO$_3$H wherein n is a mixture of 6, 8, 10 and possibly 12, |

TABLE 2-continued

| | |
|---|---|
| LL1121B | predominantly 8 barium perfluoro(2,5-dimethyl)-3,6-dioxatridecanoate |
| BC14(06) | barium perfluoro 3,5,7,9,11,13-hexaoxatetradecanoate |
| BS-12(H) | barium lauryl sulfate |
| NS-12(H) | sodium lauryl sulfate |
| CC-18(H) | calcium stearate |
| BaC-8 | barium perfluorooctanoate |
| BaC-9 | barium perfluorononanoate |
| AWG-26 | Solid copper wire 404 micrometers in diameter |
| AWG-24 | Solid copper wire 510 micrometers in diameter |
| AWG-22 | Solid copper wire 635 micrometers in diameter |

KS-10 concentrate to give 0.25% boron nitride and 330 ppm KS-10.

C. A third composition was prepared from TFE/HFP copolymer by blending with a 5 weight percent boron nitride concentrate plus a concentrate containing 0.3% calcium tetraborate to give 0.25% boron nitride and 125 ppm calcium tetraborate.

D. A fourth composition was prepared from TFE/HFP copolymer by blending with a 5 weight % boron nitride concentrate plus a concentrate containing 0.3% calcium tetraborate and a 0.3 weight % TBSA concentrate to give 0.25% boron nitride and 125 ppm calcium tetraborate plus 330 ppm of TBSA.

These four compositions were extruded onto wire under the conditions of Table 3, Column A with the following results:

TABLE 3

| | A | B | C | | D | E |
|---|---|---|---|---|---|---|
| Type Foaming | Gas Injection, F-22 | Gas Injection, F-22 | Gas Injection, F-22 | | Gas Injection, F-22 | Chemical Blow |
| Extruder Diameter (mm) | 31.75 | 31.75 | 60 mm | 25.4 | 31.75 | 31.75 |
| L/D Ratio | 30/1 | 30/1 | 30/1 | 20/1 | 30/1 | 30/1 |
| Type Extrusion | Melt Draw | Pressure | Pressure | | Pressure | Pressure |
| Screw Design Zone | | | | | | |
| Feed | 4.06/10 | 3.81/10 | 4.45/10 | 4.57/12 | 3.81/10 | 6.6/13 |
| Metering | 1.02/4 | 0.86/3.7 | .97/4.0 | — | 0.86/3.7 | — |
| Gas | 3.56/4 | 3.42/3.25 | 5.1/3.5 | — | 3.42/3.25 | — |
| Pumping | 1.57/5 | 1.32/4.25 | 1.47/6.0 | 1.9/4 | 1.32/4.25 | 2.54/8 |
| Mixing | 3.81/5.5 | 5.96/3.5 | 7.1/4.0 | 3.6/3.7 | 5.96/3.5 | 3.81/5.5 |

| | F | G | H | I | J |
|---|---|---|---|---|---|
| Type Foaming | Gas Injection, N₂ | Chemical Blow | Chemical Blow | Gas Injection, N₂ | Gas Injection, N₂ |
| Extruder Diameter (mm) | 31.75 | 31.75 | 50.8 mm | 31.75 | 31.75 |
| L/D Ratio | 30/1 | 30/1 | 28/1 | 30/1 | 30/1 |
| Type Extrusion | Pressure | Pressure | Pressure | Pressure | Pressure |
| Screw Design Zone | | | | | |
| Feed | 3.81/10 | 6.6/13 | 8.25 | 3.81/10 | 4.06/10 |
| Metering | 0.86/3.7 | | Note: long transition | 0.86/3.7 | 1.02/4 |
| Gas | 3.42/3.25 | | | 3.42/4.25 | 3.56/4 |
| Pumping | 1.32/4.25 | 2.54/8 | 6.6/10 | 1.32/4.25 | 1.57/5 |
| Mixing | 5.96/3.5 | 3.81/5.5 | | 5.96/3.5 | 3.81/5.5 |

| | A | B | C | D | E | F | G | H | I | J |
|---|---|---|---|---|---|---|---|---|---|---|
| Temperatures (°C.) | | | | | | | | | | |
| Rear | 360 | 315 | 329 | 304 | 332 | 250 | 260 | 160 | 326 | 299 | 165 |
| Center Rear | 382 | 315 | 315 | | 260 | 285 | 232 | 188 | 332 | 299 | 177 |
| Center | 371 | 315 | | | 260 | 285 | 232 | 201 | 332 | 291 | 165 |
| Center Front | 382 | 315 | | | 268 | 320 | 254 | 201 | 321 | 288 | 168 |
| Front | 382 | 315 | 321 | 315 | 273 | 330 | 273 | 201 | 321 | 282 | 171 |
| Adaptor | 371 | 315 | 315 | 315 | 223 | 315 | 273 | 204 | 357 | 279 | 182 |
| X Head | 326 | 325 | 327 | | 282 | 320 | 288 | 204 | 360 | 282 | 177 |
| Die | 326 | 330 | 329 | | 282 | 320 | 288 | 204 | 371 | 282 | 177 |
| Melt | 387 | 320 | 343 | | 125 | 285 | 278 | 210 | 343 | 282 | 178 |
| Screw Speed | 80 | 60 | 41 | | 72 | 6 | 80 | 70 | 5 | 40 | 25 |
| Air Gap (meters) | 4.5 | 4.6 | 10 | | 4.6 | 4.6 | 4.6 | 4.6 | 10 | 4.6 | 4.5 |
| Wire Size (mm) | 0.643 | 0.51 | 0.51 | | 0.58 | 0.643 | 0.508 | 0.51 | 0.406 | 0.508 | 0.51 |
| Wire Speed (m/min.) | 18 | 41 | 838 | | 22 | 34 | 48.6 | 43 | 30 | 20 | 7.6 |
| Wire Preheat (°C.) | 65 | 132 | 223 | | 104 | 65 | 99 | 82 | 150 | 93 | none |
| Crosshead Melt Pressure (MPa) | 14 (FEP) | 4.9 | 13.8 | | 4.9 | 11.7 | 9.6 | 23.4 | 4.8 | 5.2 | 5.2 |
| Gas Pressure (1KPa) | 0.7 | 0.7 | 0.5 | | 0.7 | None | 2.1 | None | None | 2.4 | 2.1 |
| Vacuum (mm Hg) | 380 | None | None | | None | None | None | None | None | None | None |
| Die (mm) | 5.05 | 1.32 | 0.73 | | 1.32 | 0.914 | 1.3 | 1.3 | 0.56 | 1.6 | 2.1 |
| Guide Tip (mm) | 1.91 | 0.59 | 0.56 | | 0.59 | 0.685 | 0.64 | 0.56 | 0.43 | 0.58 | 0.56 |
| Foam Core Size (mm) | 3.30 | 2.03 | 0.83 | | 1.45 to 1.9 | 1.15 | 2.15 | 2.3 | 0.7 | 2.28 | ~2.5 |

Note: Balance of Extruder screw 1/d lengths are transitions and the screw front tip.

EXAMPLE 1

A. TFE/HFP copolymer was cube blended with a 5 weight percent boron nitride concentrate (compounded with TFE/HFP copolymer in a 28 mm W&P twin screw extruder as described earlier) in the ratio needed to give a product with 0.25% boron nitride.

B. A second composition was prepared from TFE/HFP copolymer by blending a 5 weight boron nitride concentrate plus a 0.3 weight %

TABLE 4

| Composition | % V | AFCD (M) | cc/cm³ |
|---|---|---|---|
| A. | 55 | 381 | 18,000 |
| B. | 60 | 152 | 312,000 |
| C. | 55 | 100 | 2,800,000 |
| D. | 58 | 76 | 12,000,000 |

As seen from these results, the KS-10 can be used with boron nitride, and it gives enhanced foam nucleation. Similarly, TBSA can be used in conjunction with boron nitride and calcium tetraborate, and it gives enhanced nucleation.

EXAMPLE 2

TFE/HFP copolymer was blended with a 5% boron nitride concentrate and with a 0.3% BaS-10 concentrate to give the compositions shown in Table 5.

Each composition was foamed onto wire using the conditions of Table 3, Column A.

TABLE 5

| Additive | Conc. (ppm) | AFCD (M) |
|---|---|---|
| None | — | 635 |
| Boron nitride | 5000 | 125 |
| BaS-10 | 125 | 760 |
| BaS-10 | 500 | 100 |
| BaS-10 | 1000 | 75 |
| BaS-10 | 1500 | 255 |

As shown above, BaS-10 is a very effective nucleant at low concentrations compared with boron nitride, a traditional nucleating agent used with TFE/HFP copolymers. It should also be noted that there is an optimum concentration for the BaS-10 nucleating agent.

EXAMPLE 3

Samples of TFE/HFP copolymer containing several concentrations of various salts of TBSA were prepared by blending virgin resin with the appropriate ratio of concentrate containing 0.3% of the fluorosulfonic acid salt. These compositions were foamed onto wire as described in Table 3, Column A, with the results shown in Table 6. The last column shows the deviation from the average diameter (3300 micrometers) of the foam insulated wire.

TABLE 6

| Additive | Conc. (ppm) | AFCD (M) | % V | Deviation (M) |
|---|---|---|---|---|
| Boron nitride (control) | 5500 | 127 | 58 | ±76 |
| ZrS-10 | 75 | 685 | 61 | ±127 |
|  | 300 | 387 | 58 | ±127 |
|  | 500 | 76 | 67 | ±76 |
|  | 1000 | 76 | 65 | ±76 |
|  | 2000 | 203 | 65 | ±127 |
|  | 3000 | 203 | 56 | ±127 |
| CrS-10 | 75 | 635 | 52 | ±50 |
|  | 300 | 431 | 59 | ±76 |
|  | 500 | 101 | 62 | ±50 |
|  | 1500 | 127 | 62 | ±50 |
|  | 2000 | 89 (a) | 37 | — |
|  | 3000 | (b) | (b) | — |
| CeS-10 | 63 | 559 | 63 | ±127 |
|  | 250 | 635 | 65 | ±127 |
|  | 500 | 762 | 72 | ±127 |
|  | 1000 | 381 | 66 | ±76 |
|  | 2000 | 178 | 67 | ±76 |
|  | 3000 | 127 | 62 | ±50 |
| KS-10 | 63 | 762 | 78 | ±127 |
|  | 250 | 304 | 65 | ±76 |
|  | 500 | 241 | 66 | ±76 |
|  | 1000 | 228 | 64 | ±76 |
|  | 2000 | (b) | (b) | — |
| HS-10 | 63 | 762 | 61 | ±76 |
|  | 250 | 203 | 65 | ±76 |
|  | 500 | 127 | 64 | ±76 |
|  | 1000 | 127 | 61 | ±76 |
| AS-10 | 500 | 889 | 60 | ±100 |
|  | 1000 | 127 | 58 | ±50 |
|  | 2000 | 139 | 60 | (b) |
| SrS-10 | 500 | 139 | 58 | ±100 |

TABLE 6-continued

| Additive | Conc. (ppm) | AFCD (M) | % V | Deviation (M) |
|---|---|---|---|---|
|  | 2000 | 127 | 59 | ±75 |
|  | 3000 | 228 | 57 | ±127 |
| CaS-10 | 500 | 203 | 41 | ±76 |
|  | 1000 | 228 | 41 | ±100 |
|  | 1500 | 406 | 41 | ±127 |
| Zn-10 | 1000 | 508 | 20 | ±127 |
|  | 2000 | 381 | 20 | ±127 |
|  | 3000 | 381 | 20 | ±127 |
| BaS-10 | 125 | 762 | 20 | (c) |
|  | 500 | 101 | 55 | ±50 |
|  | 1000 | 76 | 55 | ±50 |
|  | 1500 | 254 | 40 | ±150 |
| LS-10 | 500 | 178* | 55 | ±75 |
|  | 1000 | 178* | 56 | ±75 |
| FS-10 | 75 | 406 | 52 | ±250 |
|  | 150 | 101 | 55 | ±50 |
|  | 300 | 101 | 58 | ±50 |
|  | 500 | 76 | 55 | ±50 |
|  | 1000 | 76 | 55 | ±59 |

*Cells collapsed to ellipses to the indicated minor diameter. If these cells were spherical cells, they would be 280 micrometers in diameter.
(a) open cells
(b) gas injector probe plugged
(c) no record As seen above, all of these fluorosulfonic acid salts (and the HS-10 itself) function as nucleating agents. Some are much better than others and the performance of each one varies with concentration. In addition to cell size and void content variation, there are significant fluctuations in diameter and capacitance.

EXAMPLE 4

A series of samples containing various levels of salts of three other types of sulfonic acids and a phosphonic acid were also prepared, extended in TFE/HFP copolymer and foamed onto wire, as described in Example 3, with the results shown in Table 7. The last column shown the deviation from the average diameter (3300 micrometers) of the foam insulated wire.

TABLE 7

| Additive | Conc. (ppm) | AFCD (M) | % V | Deviation (M) |
|---|---|---|---|---|
| BS-9A | 500 | 762 | 75 | (b) |
|  | 1000 | 762 | 62 | (b) |
|  | 2000 | 381 | 60 | ±75 |
|  | 3000 | 253 | 54 | ±75 |
| BS-8 | 500 | 254 | 56 | ±100 |
|  | 1000 | 228 | 57 | ±75 |
|  | 2000 | 101 | 59 | ±50 |
| KS-8C | 1500 | 635 | 40 | ±200 |
|  | 3000 | 400 | 40 | ±200 |
| BTBP | 1500 | 64 | 80 | ±200 |
|  | 3000 | 25–67 | ~70 (a) | (c) |

(a) open cells
(b) unstable; diameter control was poor
(c) unstable; foaming in crosshead As seen from the above results, the three barium salts are effective as nucleating agents for TFE/HFP copolymers, whereas the potassium salt is not.

COMPARATIVE EXAMPLE A

In contrast to Examples 3 and 4, samples containing various levels of other types of salts (not within the invention) in TFE/HFP copolymers were prepared in the same manner from concentrates containing 0.3% of the salt. These compositions were also foamed onto wire as described in Table 3, Column A with the results shown in Table 8.

TABLE 8

| Additives | Conc. (ppm) | AFCD (M) | % V |
|---|---|---|---|
| LL1121B | 500 | 1016 | 65 |
|  | 1000 | 558 | 46 |
|  | 2000 | 1016 | 45 |
|  | 3000 | 1016 | 63 |
| BC14(06) | 500 | 890 | 52 |
|  | 1000 | 762 | 55 |
|  | 2000 | 890 | 55 |
|  | 3000 | 1016 | 62 |
| BS-12(H) | 500 | 431 | 57 |
|  | 1000 | 711 | 52 |
|  | 2000 | 889 | 57 |
|  | 3000 | 889 | 57 |
| CC-18(H) | 500 | 685 | 60 |
|  | 1000 | 1270 | 62 |
|  | 2000 | 1524* | 63 |
| BaC-8 | 500 | 635 | 46 |
|  | 1000 | 635 | 45 |
| BaC-9 | 500 | 1016 | 42 |
|  | 1000 | 762 | 53 |
|  | 1500 | 889 | 53 |

*Foam cells blistered outside the insulation surface. All of the compositions gave large cell size (i.e., greater than 400 micrometers) and produced unstable capacitance and diameter in extrusion.

EXAMPLE 5

Compositions with tetrafluoroethylene(TFE)/perfluoro(propyl vinyl ether) (PPVE) copolymers (TFE/PPVE copolymers) were made up using a 0.3% concentrate of BaS-10 as described in Example 2. These compositions were foamed onto wire according to the conditions of Table 3, Column A. The results are shown in Table 9. The capacitance and diameter stability during extrusion are shown in the last column.

TABLE 9

| Additive | Conc. (ppm) | AFCD (M) | % V | Remarks |
|---|---|---|---|---|
| TFE/PPVE(1) | | | | |
| Boron nitride (control) | 5000 | 300 | 55 | (a) |
| BaS-10 | 63 | 406 | 51 | (b) |
|  | 125 | 330 | 57 | (b) |
|  | 250 | 304 | 55 | (b) |
|  | 500 | 304 | 55 | (b) |
|  | 1000 | 102 | 55 | (b) |
|  | 2000 | 89 | 57 | (b) |
|  | 3000 | 127 | 54 | (b) |
| TFE/PPVE(2) | | | | |
| Boron nitride (control) | 5000 | 255 | 55 | (a) |
| BaS-10 | 500 | 286 | 57 | (c) |
|  | 1000 | 191 | 58 | (c) |
|  | 2500 | 51 | 60 | (a) |
|  | 3000 | 76 | 62 | (a) |

(a) Steady extrusion
(b) Head pressure very low in extrusion and some foaming in the crosshead occurred to make stability of the process borderline. This occurred because the extruder screw design was not optimized for TFE/PPVE(1).
(c) Extrusion not steady As seen from these results BaS-10 is an effective nucleating agent for TFE/PPVE copolymer resins. Note that there is an optimum concentration range to achieve the smallest cell size.

EXAMPLE 6

ETFE copolymer containing 2 wt. % boron nitride or varying amounts of fluorosulfonic acid salts as indicated in Table 10 was foamed onto wire at about 40 meters/minute according to the conditions of Table 3, Column B. This produced a 0.7 mm thick foamed insulation on AWG-24 solid copper wire having capacitance values near 60 pF/m at a foam void level of about 60% (Table 10 except for KS-8 and KS-8C). For KS-8 and KS-8C this produced a 0.28 mm thick foamed insulation on AWG-24 wire having capacitance values near 136 pF/m (a foam void level of about 42%). Relative foaming performance, as indicated by insulation diameter and capacitance variability and by foam cell size, is shown in Table 10. The last column shows the deviation from the average core diameter of 1900 micrometers and the deviation from the average capacitance of 62–69 pF/m, except for KS-8 and KS-8C wherein the deviations are from an average core diameter of 1068 micrometers and an average capacitance of 138 pF/m.

TABLE 10

| Additive | Conc. (ppm) | AFCD (M) | Deviation (M; pF/m) |
|---|---|---|---|
| None | None | 432 | (b) |
| LS-10 | 750 | — | (a) |
|  | 1500 | — | (a) |
|  | 3000 | — | (a) |
| CaS-10 | 750 | 76 | (c) ±13; ±0.3* |
|  | 1500 | 51 |  |
|  | 3000 | 51 |  |
| BaS-10 | 750 | 178 | (c) ±38; ±1.5 |
|  | 1500 | 178 |  |
|  | 3000 | 178 |  |
| ZnS-10 | 750 | 432 | (d) ±40; ≥15 |
|  | 1500 | 432 |  |
|  | 3000 | 432 |  |
| AS-10 | 750 | 500 | (d) ±50; ≥15 |
|  | 1500 | 432 |  |
|  | 3000 | 483 |  |
| FS-10 | 750 | 635 | (c) ±10; ±0.3 |
|  | 1500 | 635 |  |
|  | 3000 | 500 |  |
| KS-8 | 250 | 127 | (c) ±10; ±0.3 |
|  | 500 | 114 |  |
|  | 1000 | 76 |  |
|  | 2000 | 50 |  |
|  | 3000 | 89 |  |
| KS-8C | 250 | 178 | (c) ±10; ±0.3 |
|  | 500 | 152 |  |
|  | 2000 | 64 |  |
|  | 3000 | 38–76 |  |

(a) gas injector probe plugged
(b) low void content, 32% unstable extrusion
(c) extrusion foaming stable
(d) extrusion foaming unsteady
*capacitance average of 57 pF/m

EXAMPLE 7

BaS-10 was evaluated as a nucleating agent for ETFE copolymer in a high speed extrusion (625 m/min.) of thin wall foam-skin insulation on AWG-24 solid copper wire. Conditions used are given in Table 3, Column C and the results are given in Table 11. A dielectric constant of 1.7 corresponds to a foam void level of 48%.

TABLE 11

| Additive | C (pF/m) | Diameter (M) | Foam DC | AFCD (M) | Ex St |
|---|---|---|---|---|---|
| 2% BN (Control Resin) | 121.4 ± 1.0 | 1092 ± 50 | 1.68 | 50 | (a) |
| 500 ppm BaS-10 | 132.2 ± 0.3 | 1049 ± 13 | 1.71 | 50 | (b) |
| 1000 ppm BaS-10 | 125.3 ± 0.3 | 1054 ± 13 | 1.63 | 38 | (c) |
| 2000 ppm BaS-10 | 131.2 ± 0.3 | 1049 ± 13 | 1.70 | 25 | (b) |
| 3000 ppm BaS-10 | 128.9 ± 1.6 | 1049 ± 25 | 1.68 | 50 | (b) |

TABLE 11-continued

| Additive | C (pF/m) | Diameter (M) | Foam DC | AFCD (M) | Ex St |
|---|---|---|---|---|---|
| BaS-10 | | | | | |

(a) Good, steady
(b) A few capacitance spikes. These positive spikes in the capacitance chart record occurred every 5-8 minutes.
(c) Excellent, very steady As seen from the above results, BaS-10 not only gives small cell size but is also improves both diameter and capacitance control in this miniature foam.

EXAMPLE 8

An E/CTFE copolymer (Halar ® 500 available from Ausimont Chemical Co.) was foamed with $CHF_2Cl$ gas injection using a start-stop extrusion procedure. This technique was necessary to avoid immediate plugging of the gas injection probe (improper screw design) The foaming process was carried out according to the conditions given in Table 3, Column D. Nucleated compositions were prepared using a 0.3% concentrate of the salt in the copolymer. The results are given in Table 12.

TABLE 12

| Additive | Conc. (ppm) | FCC (pF/m) | Foam DC | % V | AFCD (M) | cc/cm$^3$ |
|---|---|---|---|---|---|---|
| None | 0 | 98.4 | 2.01 | 28 | 304 | 336,000 |
| CaS-10 | 1500 | 96.8 | 2.20 | 20 | 203 | 800,000 |
| CaS-10 | 3000 | 75.5 | 1.78 | 43 | 102 | 15,000,000 |

As seen from the results, CaS-10 is a very effective foam nucleant.

EXAMPLE 9

HAP-E/TFE, a chemical-blown ETFE copolymer foam resin commercially available from Chromatics, Inc. (Bethel, Connecticut) was foamed onto wire with and without added BaS-10 using the extrusion setup shown in Table 3, Column E. In each case, the HAP-E/TFE (210 grade) was blended into a 50/50 mix with ETFE copolymer (one virgin and one containing 0.3% BaS-10). The results are shown in Table 13.

TABLE 13

| | No Added Nucleant | Added Nucleant 1500 ppm BS-10 |
|---|---|---|
| Solid AWG-22 Dia (mm) | 0.635 | 0.635 |
| C (pF/m) | 91.9 | 74.2 |
| Stability of C (pF/m) | ±3.3 | ±0.7 |
| Foam Diameter (mm) | 2.39 | 2.54 |
| D C | 2.0 | 1.85 |
| % V | 30 | 35 |
| AFCD (M) | 230 | 38 |
| cc/cm$^3$ at 33% voids | 38,000 | 13,000,000 |

As seen from the results, this nucleating agent is very effective in this system.

EXAMPLE 10

Chemical-blown ETFE copolymer compositions were prepared by dry blending powdered ETFE copolymer with Ficel ® and the sulfonic acid salt indicated in Table 14. The blends were pelletized in a lab scale California Pellet Mill before evaluation. The compositions were foamed onto wire according to conditions given in Table 3, Column E. The results are given in Table 14. In each case the amount of blowing agent was 0.38 wt. %.

TABLE 14

| Additive Conc. | BaS-10 1000 ppm | CaS-10 1000 ppm | KS-8 1000 ppm | KS-8 3000 ppm |
|---|---|---|---|---|
| C (pF/m) | 170.6 | 175.5 | 198.4 | 183.7 |
| Foam Diameter (mm) | 1.17 | 1.15 | 1.10 | 1.08 |
| DC | 1.9 | 1.9 | 1.9 | 1.75 |
| % V | 36 | 36 | 36 | 45 |
| AFCD (M) | 76 | 51 | 51 | 38 |
| cc/cm$^3$ | 1,500,000 | 6,500,000 | 6,500,000 | 18,000,000 |

As seen from the results, these compositions give good quality foam with small cell size.

EXAMPLE 11

Blends of 98% of a broad molecular weight distribution linear high density polyethylene (0.964 g/cm$^3$) having a melt index of 1.9 (standard method 190° C./2.16 kg) and 2% of a high pressure branched polyethylene with a 0.929 g/cm$^3$ density and a melt index of 1.9, containing various levels of sulfonic acid and phosphonic acid salts, were prepared from 0.3% concentrates and foamed as an approximately 60% void insulation onto wire using conditions given in Table 3, Column F. The results are given in Table 15. The last column shows the capacitance in pF/m and the deviation from the average diameter (2150 micrometers) of the foam insulated wire.

TABLE 15

| Additive | Conc. (ppm) | AFCD (M) | Remarks |
|---|---|---|---|
| None | 0 | 360 | (a) 55–88 pF/m; ±150 M |
| FS-10 | 60 | 229 | |
| | 150 | 165 | |
| | 750 | 63 | (b) 52 ± 0.3 pF/m; ±50 M |
| | 1500 | 51 | |
| | 3000 | 51 | |
| CrS-10 | 60 | 203 | |
| | 150 | 152 | |
| | 750 | 102 | (b) 52 ± 0.3 pF/m; ±50 M |
| | 1500 | 51 | |
| | 3000 | 38 | |
| KS-10 | 60 | 254 | (a) 55–88 pF/m; ±100 M |
| | 150 | 254 | |
| | 750 | 203 | (a) 55–88 pF/m; ±75 M |
| | 1500 | 127 | (b) 52 ± 0.3 pF/m; ±50 M |
| | 3000 | 237 | |
| BaS-10 | 63 | 102 | |
| | 125 | 89 | |
| | 250 | 76 | |
| | 500 | 68 | (b) 52 ± 0.3 pF/m; ±25 M |
| | 1000 | 64 | |
| | 3000 | 64 | |
| CaS-10 | 63 | 76 | |
| | 125 | 76 | |
| | 250 | 64 | (b) 52 ± 0.3 pF/m; ±25 M |
| | 1000 | 51 | |
| KS-8 | 500 | 51 | |
| | 1000 | 43 | (b) 52 ± 0.3 pF/m; ±25 M |
| | 2000 | 33 | |
| | 3000 | 33 | |
| KS-6A | 500 | 89 | |
| | 1000 | 89 | (b) 52 ± 0.3 pF/m; ±25 M |
| | 2000 | 89 | |
| | 3000 | 51 | |
| LS-10 | 63 | 152 | |
| | 125 | 178 | |
| | 250 | 127 | (b) 52 ± 0.3 pF/m; ±101 M |
| | 500 | 101 | |
| | 1000 | 127 | |
| KS-8C | 500 | 100 | |
| | 1000 | 75 | (b) 52 ± 0.3 pF/m; ±25 M |
| | 2000 | 64 | |
| | 3000 | 40 | |

TABLE 15-continued

| Additive | Conc. (ppm) | AFCD (M) | Remarks |
|---|---|---|---|
| NTBP | 500 | 127 | (b) 56 ± 0.3 pF/m; ±25 M |
|  | 1000 | 76 |  |
|  | 1500 | 25 |  |
|  | 3000 | 76 |  |
| NaS-1 | 500 | 76 | (b) 56 ± 0.3 pF/m; ±25 M |
|  | 1000 | 64 | (b) |
|  | 3000 | 51 | (b) |
| KS-1 | 500 | 203 | (a) 52-88 pF/m; ±75 M |
|  | 1000 | 178 |  |
|  | 3000 | 152 |  |
| KS-1(H) | 500 | 330 | (a) 69-85 pF/m; ±50 M |
|  | 1000 | 152 | (b) 56 ± 0.3 pF/m; ±25 M |
|  | 2000 | 89 |  |
|  | 3000 | 64 |  |
| BaS-3(H) | 500 | 175 | 62 ± 0.7 pF/m; ±31 M |
|  | 1000 | 38 | (b) 60 ± 0.3 pF/m; ±13 M |
|  | 2000 | 60 | 59 ± 0.2 pF/m; ±6 M |
| BaP-A | 1000 | 75 | 59 ± 0.2 pF/m; ±13 M |
|  | 2000 | 100 | (b) 60 ± 0.2 pF/m; ±25 M |
| NaP-A | 500 | 325 | (a) 60-70 pF/m; ±75 M |
|  | 1000 | 100 | (b) 59 ± 0.2 pF/m; ±25 M |
|  | 2000 | 100 | 59.5 ± 0.2 pF/m; ±25 M |
| BaS-A1(H) | 1000 | 75 | (b) 58 ± 0 pF/m; ±25 M |
|  | 2000 | 75 | 58.5 ± 0.1 pF/m; ±25 M |
| NaS-A(II) | 1000 | 100 | (b) 57.5 ± 0 pF/m; ±38 M |
|  | 2000 | 100 | 56.0 ± 0 pF/m; ±25 M |
| TEAS-10 | 1000 | 28 | (b) 60 ± 0 pF/m; ±25 M |
|  | 2000 | 275 | (a) 91 ± 16 pF/m/ ±100 M |

(a) unstable capacitance
(b) stable capacitance

As seen from these results, all of these salts act as nucleants, with the KS-8 and KS-8C being especially effective. Of the S-10 salts, iron and calcium are very effective nucleants.

COMPARATIVE EXAMPLE B

Several other types of organic acid salts were incorporated into the same polyethylene blend as specified in Example 11 and foamed onto wire using the conditions of Example 11. The results are shown in Table 16. The last column shows the capacitance and the deviation from the average diameter (2150 micrometers) of the foam insulated wire.

TABLE 16

| Additive | Conc. (ppm) | AFCD (% V = 60) (M) | Remarks |
|---|---|---|---|
| None | — | 475 |  |
| NS-12(H) | 63 | 508 |  |
|  | 250 | 300 |  |
|  | 500 | 254 | (b) 56 to 75 pF/m; ±152 M |
|  | 1000 | 406 |  |
|  | 2000 | 457 |  |
| CC-18(H) | 500 | 457 |  |
|  | 1000 | 457 | (b) 56 to 75 pF/m; ±152 M |
|  | 2000 | 457 |  |
| BS-12(H) | 600 | 230 | (b) 52 to 76 pF/m; ± 100 M |
|  | 1200 | 230 |  |
|  | 1800 | 230 | (a) |
|  | 2940 | 230 | (a) |
| NS-12(H) | 600 | 300 | (c) |
|  | 1200 | 380 | (b) like BS-12(H) |
| Na TCA | 1000 | 304 | (b) like BS-12(H) |
|  | 2000 | 280 |  |

TABLE 16-continued

| Additive | Conc. (ppm) | AFCD (% V = 60) (M) | Remarks |
|---|---|---|---|
|  | 3000 | 254 |  |

(a) Partial plugging of the gas injector probe
(b) unstable extrusion
(c) fairly stable As seen from the above results, these specific salts are not effective as nucleants for polyethylene.

EXAMPLE 12

A broad molecular weight distribution, high density polyethylene copolymer (density=0.945 g/cc, melt index=0.4, standard method 190° C./2.16 kg) containing 0.75% by weight axodicarbonamide blowing agent was foamed onto wire using the conditions given in Table 3, Column G. This was compared with two, similarly chemically-blown, blended polyethylene resins, one with BaS-10 added and one without. As seen from Table 17, the BaS-10 is a very effective nucleant for this chemically blown polyethylene system.

TABLE 17

| Properties | High Density PE | PE Blend | PE Blend plus 1250 ppm BaS-10 |
|---|---|---|---|
| C (pF/m) | 6.52 | 6.04 | 5.64 |
| Foam Diameter (mm) | 2.08 | 2.23 | 2.28 |
| DC | 1.77 | 1.72 | 1.63 |
| % V | 33 | 38 | 44 |
| AFCD (M) | 34 | 41 | 34 |
| Cell Nature | (a) | (b) | (b) |
| cc/cm$^3$ | 16,500,000 | 11,500,000 | 22,000,000 |

(a) irregular and interconnecting cells
(b) spherical and distinct separate cells

EXAMPLE 13

Polyarylate of the following composition was foamed according to the conditions given in Table 3, Column H.
polyarylate
2000 ppm BaS-10 powder (dry blend)
1250 ppm Expandex ® chemical blowing agent The resultant foamed composition comprised a 0.16 mm wire coating on AWG-26 solid copper wire. This coating was an excellent foam containing 30% voids with foam cells of 17 micrometers.

EXAMPLE 14

A nylon blend was foamed according to the conditions given in Table 3, Column I.
Zytel ® 301 HS, nylon resin (commercially available)
5000 ppm KS-8, fully compounded The comparison which was made in extrusion foaming, with and without KS-8 as the nucleating agent, is shown in Table 18.

TABLE 18

| Resin | % V | AFCD (M) | cc/cm$^3$ |
|---|---|---|---|
| Zytel ® 301HS | 3 | 762 | 60 |
| Zytel ® 301HS 5000 ppm KS-8 | 65 | 508 | 7,800 |

EXAMPLE 15

A melt processable rubber (thermoplastic elastomer) having a dielectric constant of 10.2 was foamed according to the conditions in Table 3, Column J, producing the results, with and without KS-8 as the nucleating agent, shown in Table 19.

TABLE 19

| KS-8 nucleant, ppm | none | 5,000 |
|---|---|---|
| % V | ~25 | ~40 |
| AFCD (M) | 457 | 89 |
| cc/cm$^3$ | $4.5 \times 10^3$ | $1 \times 10^6$ |

The afore description, including the examples, and the claims which follow are intended as a disclosure of the invention and preferred embodiments thereof. There is no intent to limit the invention to only those embodiments disclosed, since one skilled in the art will readily envision other embodiments from the teaching provided herein.

EXAMPLE 16

Polymer A of this was a copolymer of ethylene and 12% methacrylic acid, 40% neutralized with a basic zinc compound, to give a polymer with a melt index of 10. Polymer B of this example was a high pressure, branched polyethylene with a density of 0.929 g/cm$^3$ and a melt index of 1.9. A concentrate was made of 4% KS-8 in Polymer A. This concentrate was diluted with a blend of 98% Polymer A and 2% Polymer B to give various concentrations of KS-8 in the blends to be extruded, as shown in Table 20. These samples were extruded using the conditions of Table 3, column F. The average foam cell diameter results are shown in Table 20, as are the deviations from the average capacitance.

TABLE 20

| Additive | Conc. (ppm) | AFCD (M) | Remarks |
|---|---|---|---|
| None | 0 | 241 | ±3 pF/m* |
| KS-8 | 500 | 76 | ±1.5 pF/m |
| KS-8 | 1000 | 51 | ±1.5 pF/m |
| KS-8 | 2000 | 51 | ±0.7 pF/m |

*Very low void content (20%)

Although the above description and the claims which follow include preferred embodiments of the invention, it is to be understood that there is no intent to limit the invention to the precise constructions herein disclosed and claimed, and all right is reserved to all changes and modifications coming within the scope of the invention as defined herein.

We claim:

1. In an improved process for producing a foam of a thermoplastic resin composition, the improvement characterized in that the process is carried out with a nucleating-effective amount of at least one thermally stable compound which is selected from the group consisting of sulfonic and phosphonic acids and salts thereof, so as to produce a foam having uniformity of cell size, small cell size, and high void content.

2. Process of claim 1 wherein the nucleating agent is selected from
   (a) free acids and salts of partially or totally fluorinated aliphatic sulfonic and phosphonic acids, which optionally may contain cycloalkyl groups and/or ether oxygen; and
   (b) free acids and salts of aromatic sulfonic and phosphonic acids, in which the aromatic ring, optionally, is substituted with alkyl, fluorine-containing alkyl, and/or hydroxyl groups.

3. Process of claim 1 wherein the nucleating agent is of the formula

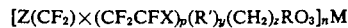

wherein:
the bivalent groups, except for RO$_3$, may be present in any sequence;
Z is selected from CCl$_3$ CCl$_2$H, H, F, Cl, F, Cl and Br;
each X, independently, is selected from H, F, Cl and CF$_3$;
R is selected from sulfur and phosphorus;
M is selected from H and a metallic, ammonium, substituted ammonium and quaternary ammonium cation;
each of x and z, independently, is an integer and is 0 to 20;
p is an integer and is 0 to 6;
y is 0 or 1;
x+y+z+p is a positive integer or, if x+y+z+p is 0, then Z is CCl$_3$ or CCl$_2$H;
n is the valence of M; and
R' is selected from
a C$_{5-6}$ perfluorinated alicyclic ring diradical;
a C$_{1-16}$ perfluorinated aliphatic polyether diradical with repeat units selected from [CF$_2$O], [CF$_2$CF$_2$O], and [CF$_2$CF(CF$_3$)O]; and
a substituted or unsubstituted aromatic diradical, in which case, Z is H.

4. Process of claim 3 wherein the nucleating agent contains only two of the diradical units selected from (CF$_2$($_x$, (CF$_2$CFX)$_p$, (R')$_y$, and (CH$_2$)$_z$.

5. Process of claim 4 wherein the nucleating agent has a total of no more than 20 carbon atoms and M is selected from H, K, Na, Ba, Zr, Cr, Ce, Al, Sr, Ca, Zn, Li, Fe, and triethyl ammonium.

6. Process of claim 5 wherein the nucleating agent comprises at least one salt of the acid of the formula F(CF$_2$)$_x$(CH$_2$)$_z$SO$_3$H, in which x is 6 to 12 and z is 0, 1, or 2.

7. Process of claim 1 wherein the thermoplastic resin is selected from polystyrene, a styrene copolymer, and a blend comprising a styrene polymer.

8. Process of claim 1 wherein the thermoplastic resin is selected from copolymers of alpha-olefins and alpha, beta-unsaturated carboxylic acids having 3 to 8 carbon atoms, and their metal salts of Groups I to III of the Periodic Chart of the Elements.

9. Process of claim 1 wherein the nucleating agent is the potassium salt of perfluorooctane sulfonic acid, and the concentration of nucleating agent, based on the composition, is 500–3000 ppm.

10. Process of claim 1 wherein the thermoplastic resin is a tetrafluoroethylene/hexafluoropropylene copolymer, the average cell size is less than 100 micrometers, and the void content is greater than 60%.

11. Process of claim 1 wherein the thermoplastic resin is substantially a polyethylene of high density, the average cell size is less than 100 micrometers, and the void content is greater than 50%.

12. Process of claim 1 wherein the thermoplastic resin is an ethylene/tetrafluoroethylene copolymer, the average cell size is less than 100 micrometers, and the void content is greater than 50%.

13. Process of claim 12 wherein the thermoplastic resin is an ethylene/tetrafluoroethylene/perfluorobutyl ethylene copolymer.

* * * * *

UNITED STATES PATENT AND TRADEMARK OFFICE
CERTIFICATE OF CORRECTION

PATENT NO. : 5,032,621
DATED : July 16, 1991
INVENTOR(S) : Buckmaster et al.

It is certified that error appears in the above-identified patent and that said Letters Patent is hereby corrected as shown below:

Column 20:
 Claim 3, line 10, should read

-- Z is selected from $CCl_3$, $CCl_2H$, H, F, Cl, and --

Claim 3, line 13, should read -- $CF_3$; --

Signed and Sealed this

Thirteenth Day of October, 1992

Attest:

DOUGLAS B. COMER

*Attesting Officer*     Acting Commissioner of Patents and Trademarks